(12) United States Patent
Kariya

(10) Patent No.: US 6,758,064 B1
(45) Date of Patent: Jul. 6, 2004

(54) PRODUCTION METHOD AND DEVICE FOR SHEET GLASS, AND LIQUID CRYSTAL DEVICE

(75) Inventor: Hiroyuki Kariya, Yokohama (JP)

(73) Assignee: NH Techno Glass Corporation, Yokohama (JP)

( * ) Notice: Subject to any disclaimer, the term of this patent is extended or adjusted under 35 U.S.C. 154(b) by 293 days.

(21) Appl. No.: 09/763,200

(22) PCT Filed: Jul. 21, 2000

(86) PCT No.: PCT/JP00/04898

§ 371 (c)(1), (2), (4) Date: Mar. 9, 2001

(87) PCT Pub. No.: WO01/07372

PCT Pub. Date: Feb. 1, 2001

(30) Foreign Application Priority Data

Jul. 22, 1999 (JP) ............................................. 11-208171

(51) Int. Cl.⁷ .......................... C03B 17/00; C03B 23/02
(52) U.S. Cl. ................. 65/91; 65/200; 65/118; 65/95
(58) Field of Search .............................. 65/325, 66, 77, 65/83, 84, 90, 91, 95, 117, 118, 197, 194, 199, 205, 200, 201, 203, 204, 324, 525

(56) References Cited

U.S. PATENT DOCUMENTS

| | | | |
|---|---|---|---|
| 1,402,145 A | * | 1/1922 | Callard .......................... 65/175 |
| 1,519,259 A | * | 12/1924 | Hitchcock ....................... 65/95 |
| 3,338,696 A | * | 8/1967 | Dockerty ....................... 65/145 |
| 3,607,183 A | * | 9/1971 | Flori ............................... 65/83 |
| 3,682,609 A | | 8/1972 | Dockerty |
| 3,723,082 A | * | 3/1973 | Knowles et al. ................. 65/84 |
| 4,108,714 A | * | 8/1978 | Keller et al. ................. 264/213 |
| 4,525,194 A | * | 6/1985 | Rudoi ......................... 65/145 |
| 4,612,030 A | * | 9/1986 | Smids ............................ 65/91 |
| 4,984,890 A | * | 1/1991 | Tojo et al. ................... 356/509 |
| 5,536,581 A | * | 7/1996 | Shetterly et al. ............. 428/432 |
| 6,502,423 B1 | * | 1/2003 | Ostendarp et al. ......... 65/29.14 |

FOREIGN PATENT DOCUMENTS

| | | | | |
|---|---|---|---|---|
| JP | B1 54-40566 | | 12/1979 | |
| JP | 358052618 A | * | 3/1983 | ................. 349/138 |
| JP | A 2-225326 | | 9/1990 | |
| JP | A 10-53426 | | 2/1998 | |
| JP | A 10-291826 | | 11/1998 | |

* cited by examiner

Primary Examiner—Steven P. Griffin
Assistant Examiner—Carlos Lopez
(74) Attorney, Agent, or Firm—Oliff & Berridge, PLC (57) ABSTRACT

When a glass substrate for a liquid crystal display is manufactured using the downdraw method. strain caused by differences in the tempsrature of the sheet glass achieved as a result of cooling are reduced. Furth rtore. minute strain that occurs when the sheet glass manufactured using the downdraw method is out into smaller pieces is inhibited.

When the sheet glass 8 is manufactured using the downdraw method. a temperature distribution is formed in the width-wise direction of the sheet glass 8 by the heat treating unit 9 used in the slowly cooling process after molding. This temperature distribution is a distribution that can offset the temperature distribution in the sheet glass 8 caused by the fact that the thickness of the sheet glass 8 after molding is greater in the edge areas than that in the surface area.

10 Claims, 7 Drawing Sheets

|                | L   | C   | R   |
|----------------|-----|-----|-----|
| 1 ATMOSPHERE   | 797 | 808 | 795 |
| 1 GLASS        | 711 | 730 | 702 |
| 2 ATMOSPHERE   | 748 | 761 | 743 |
| 2 GLASS        | 690 | 695 | 683 |
| 3 ATMOSPHERE   | 736 | 766 | 731 |
| 3 GLASS        | 657 | 660 | 654 |
| 4 ATMOSPHERE   | 734 | 764 | 719 |
| 4 GLASS        | 631 | 630 | 622 |

PRODUCTION METHOD AND DEVICE FOR SHEET GLASS, AND LIQUID CRYSTAL DEVICE

TECHNICAL FIELD

The present invention relates to a manufacturing method by which to manufacture a thin glass plate (sheet glass) such as a glass substrate for use with liquid crystal, as well as a glass plate manufacturing apparatus and a liquid crystal device.

BACKGROUND ART

As manufacturing methods for this type of sheet glass, the float method and the downdraw method are known, but when it is desired to manufacture a glass substrate for a liguid crystal display, the downdraw method is more widely used for cost reasons, as it entails little or no polishing after molding.

An example of the downdraw method ls described in connection with the method disclosed in Japanese Patent. Application Laid-Open No. 10-291826. The method disclosed therein involves the manufacturing a glass substrate by continuously providing molten glass from a melting tank along molding surfaces, fusing the glass on both sides below the molds, and drawing the glass downward using rollers at the edge areas of the glass.

Because the glass substrate obtaied through this type of manufacturing method is formed such that both surfaces at the time of molding are free surfaces. and such that the glass surfaces that were in contact with the mold are fused together, it offers superior smoothness and flatness.

Generally, the glass plate that is obtained through this manufacturing method and has outer dlmonsions of 1m×1 m and a thickness of 0.7 mm is cut to a size of 550×650 nm or 600×720 nm, and is used as a glass substrate for a liquid crystal display. Examples of such a liquid crystal device glass substrate include a TFT glass substrate or a color filter glass substrate.

For a TFT glass substrate. a thin film transistor (TFT) is formed on the surface of the glass substrate, while for a color filter glass substrate, a color filter is formed on the surface of the glass substrate. A liquid crystal device is formed by encasing liquid crystal between two glas substrates an which these thin film are formed.

However, glass plates manufactured using the conventional downdraw method. have the problem that a substantial amount of strain occurs in the widthwise direction (the direction perpendicular to the direction in which the glass is drawn). This strain is caused by a plate thicunes distribution peculiar to the downdraw method. The plate thickess of sheet glass manufactured using the dowzdraw method is larger at the edge areas in the widthwise direction than at the center area (called the 'surface area' below). Consequently, when the sheet glass is slowly cooled from a high temperature after molding. because the cooling speed of the surface area is faster than the cooling speed at the edge areas, compressive stress occurs at the edge areas, while tensile stress occurs at the surface area, and as a result, mlinute strain occurs in the vidthwise direction. In addition, this strain tends to be relatively larger at the edge areas than at the surface area.

When a piece of this sheet glass having this type of strain distribution is cut out in the sie appropriate for a display apparatus glass substrate. the strain distribution continues to exist in a reconstructed state, which causes minute deformation of the glass substrate.

When a thin film transistor (TFT) or a tain film pattern for a color filter is formed via photolithography on the surface of the glass substrate having this type of minute deformation, exposure is not perfored accurately during the photolithography process, and as a result, the problem occurs that the precision of the thin film pattern is reduced.

Furthermore, when a TFT glass substrate is combined with a color filter glass substrate, the alignment mmrks become offset due to the minute deformation in the glass plates, and as a result, the problem occurs that the yield of the liquid crystal devices dealings.

In particular, when the glass substrate is large in size, the problem occurs that the amount of defd atlon of the glass substrate is accordingly large and the amount of offset of the pattern positioning is large as well.

The present invention was created in view of the above problems, and has the objects described below.

One object of the present invention is to inhibit the occurrence of minute strain or minute deforzation in the downdraw method.

Another object of the present invention is to prevent the occurrence of positioning offset of the pattern formed through photolithography on the surface of a glass substrate used in a display apparatus.

Yet another object of the present invention is to prevent the occurrence of strain when a piece of shoet glass that is formed through the dommdraw method is cut into a prescribed size.

Still another object of the present invention is to improve the yield obtained during manufacture of liquiid crystal devioes.

DISCLOSURE OF THE THE INVENTION

Accordingly, the present invention proposes a manufacturing method wherein, in order to ellimnate stratn caused by temperature variations in the vidthwise diroation of the sheet glass when the downdrav method is used, carries out strain reduction processes during the slow cooling of the sheet glass.

Construction 1: A glass plate manufacturing method for manufacturing a glass plate by forming molten glass into a sheet using the downdraw method and subjecting the obtained sheet glass to slow cooling using a heat treating unit, wherein a strain reduction process to reduce strain occurring in the sheet glass due to the temperature difference between the edge areas and the surface area in the widthwlse direction of the sheet glass is performed during the slow cooling.

For a glass material suitable for the downdraw method, it is preferred from the standpoint of maintaining transparency that the material have a liquid phase temperature of 1200° C. or lower, and ideally a liquid phase temperature of 1100° C. or lower. It is further preferred that the thickness of the sheet glass be between 0.5 and 1.0 nm.

It is also preferred that the strain reduction processes be carried out mmedilately after molding.

Construction 2: The glass plate manufacturing method according to the Construction 1, wherein the temperature difference occurs between the center region of the surface area and the edge areas.

Construction 3: The glass plate manufacturing method according to the Construction 1 or the Construction 2, wherein the sheet glass subjected to slow cooling exhibits a widthvise terature distribution such that the surface area has a lower temperature than the edge areas.

Construction 4: The glass plate manufacturing method according to any of Constructions 1 through 3, wherein the strain reduction processes are carried out based on the strain distribution in the post-molding glass plate measured in advance using the optical heterodyne method.

Because the strain addressed by the present invention comprises minute strain (deformation) it is preferred that the birefringence amount be measured through optical heterodyne measurement, which can measure minute strain (minute deformation) with high precision, and that the strain reduction processes be carried out based on the results of this measurement. Measurement of the atrain using the optical heterodyne method allows the widthwise temperature distribution in the sheet glass after molding to be easily understood.

Construction 5: The glass plate manufacturing method according to any of Constructions 1 through 4, wherein the strain reduction process comprises a heat treatment that forms a prescribed temperature distribution in the widthwise direction of the sheet glass so that the temperature difference in the widthwise direction of the sheet glass after molding is reduced when the sheet glass is subjected to slow cooling by means of the heat treating unit after molding.

It is preferred that the temperature range used for slow cooling of the sheet glass be 600 to 850° C. It is further preferred that the method for reducing the temperature difference in the vidthwise direction of the sheet glass comprise heat treatment by a heat treating unit having a temperature distribution whereby the widthwise temperature distribution of the sheet glass is offset.

Because this heat treatment is carried out during the slow cooling process. the vidthwise temperature distribution of the sheet glass changes with the cooling tie. Therefore. it is preferred that the temperature distribution of the heat treating unit change continuously or in steps along the direation of drawing in accordance with the temerature distribution of the sheet glass.

Construction 6: The glass plate manufacturing method according to Construction 5, wherein the thermal process is carried out at least through a process in which the sheet glass is slowly cooled from the molding temperature to a temperature near the strain point.

It is preferred that the heat treatment be carried out within a temperature range from the moldigg te pesature of the sheet glass to an extraction temperature equal to or lower than the strain point, but it is effective if the heat treatment is carried out through the slow cooling process in which the sheet glass is slowly cooled from the molding temperature to a temperature near the strain point. It is preferred that the thexIal process be carried out through a process in whioh the sheet glass ls slowly cooled from a temperature that is 400 to 500° C. lower than the molng temperature to a temperature near the strain point. In addition, it in preferred that where the widthviue temperature of the sheet glass is made essentially uniform at a temperature near the strain point, and slow cooling at or below the strain point is thereafter carried out, that the uniform temperature state of the sheet glass be maintained and that slow cooling be further carried out.

Furthermore, the preferred range for the tempeature near the strain point is 50° C. above and below the strain point.

Construction 7: The sheet glass manufacturing method according to Construction 5 or Construction 6, wherein the heat treatment is a process in whiah the temperature distribution that is formed, in the widthwise direction of the sheet glass, by the heat treating unit for beating the sheet glass is set such that the temperature difference in the the widthwise direction of the sheet glass may be reduced.

Where the temperature distribution is formed via the heat treating unit, it to preferred that, rather than foming such temperature distribution suddenly near the strain point, the temperature distribution near the strain point be used as a reference, and that a temperature distribution obtained by flattening this temperature distribution near the strain point be formed in steps or continuously in the slow cooling process from the strain point and the molding temperature.

Construction 8: The glass plate manufacturing method according to any of Constructions 1 through 3, wherein the strain reduction process reduces strain oocurring from the surface area to the edge areas by increasing the amount of extension of the edge areas relative to the amount of extension of the surfaoe area in acoordance with the heat contraction difference occurring between the edge areas and a the surface area in the wldthwise direction of the sheet glass.

It is preferred that the strain reduction processes be carried out through slow cooling within a temperature rage of 600 to 850° C.

Construction 9: A glass plate manufacturing meobod wherein the maximum strain of the manufactured sheet glass is 0.07 kg/mm$^2$ or less.

It is further preferred that the maxlmum strain be 0.04 kg/mm$^2$ or less.

Construotion 10: The glass plate manufacturing method according to any of Constructions 1 through 9, wherein the glass plate is a glass substrate used in a display apparatus.

It is preferred that the display apparatus comprlse a liquid crystal device, and that the glass substrate for the liquid crystal device have an expansion coefficient of 32–38×10$^{-7}$/° C., and that the strain point be at least 650° C.

It is preferred that the glass have a composition comprising 60–70% $SiO_2$, 7–12% $B_2O_2$, 9–13% $AL_2O_3$, 1–8% MgO, 2–8% CaO, 0.5–5% SrO, and 0.5–5% BaO, where the percentages are expressed in term of molar percentages.

It is also preferred that the glass have a composition comprising 65–75% $SiO_2$, 6–11% $B_2O_3$, 8–15% $AL^2O_3$, 3–15% MgO, 0–8% CaO, 0–1% SrO, and 0–1% BaO.

Construction 11: A glass plate manufacturing apparatus that includes a molding unit that molds molten glass provided continuouwsly from a molten glass storage tank into a sheet;

a drawing unit that draws down the sheet glass molded by the molding unit and existing in a softtned state; and a strain reduction unit that reduces the strain caused by the temperature difference occurring from the edge areas to the surface area in the widthwlse direction of the shoet glass.

Construction 12: The glass plate manufacturing apparatus according to Construction 11, wherein the strain reduction unit ls a heat treating unit that slowly cools the sheet glass after molding, and sets in the widthwise direction of the sheet glass a temperature distribution that reduces the temperature difference in the widthvise direction of the postmolding sheet glass.

It is preferred that the beat treating unit be located on one side or both sides of the sheet glass. It is also preferred that the heat treating unit be located near the surface or surfaces of the sheet glass.

Construction 13: The glass plate manufacturing apparatus according to Construction 11, wherein the strain reduction unit has a heat treating unit that slowly cools the sheet glass after molding and a unit that performs control to ensure that the amount of extension of the edge areas is larger than the amount of extension of the surface area in accordance with the tewpcrature difference from the surface area to the edge areas of the sheet glass that is being slowly cooled by the heat treating unit.

Construction 14: A liquid crystal device comprising, liquid crystal held between a pair of glass plates formed through the glass plate manufacturing method accordng to any of Constructions 1 through 10.

BEST MODE FOR CARRYING OUT THE INVENTION

Embodimonts of the present invention will be explained below with reference to the drawings.

Figure 1:
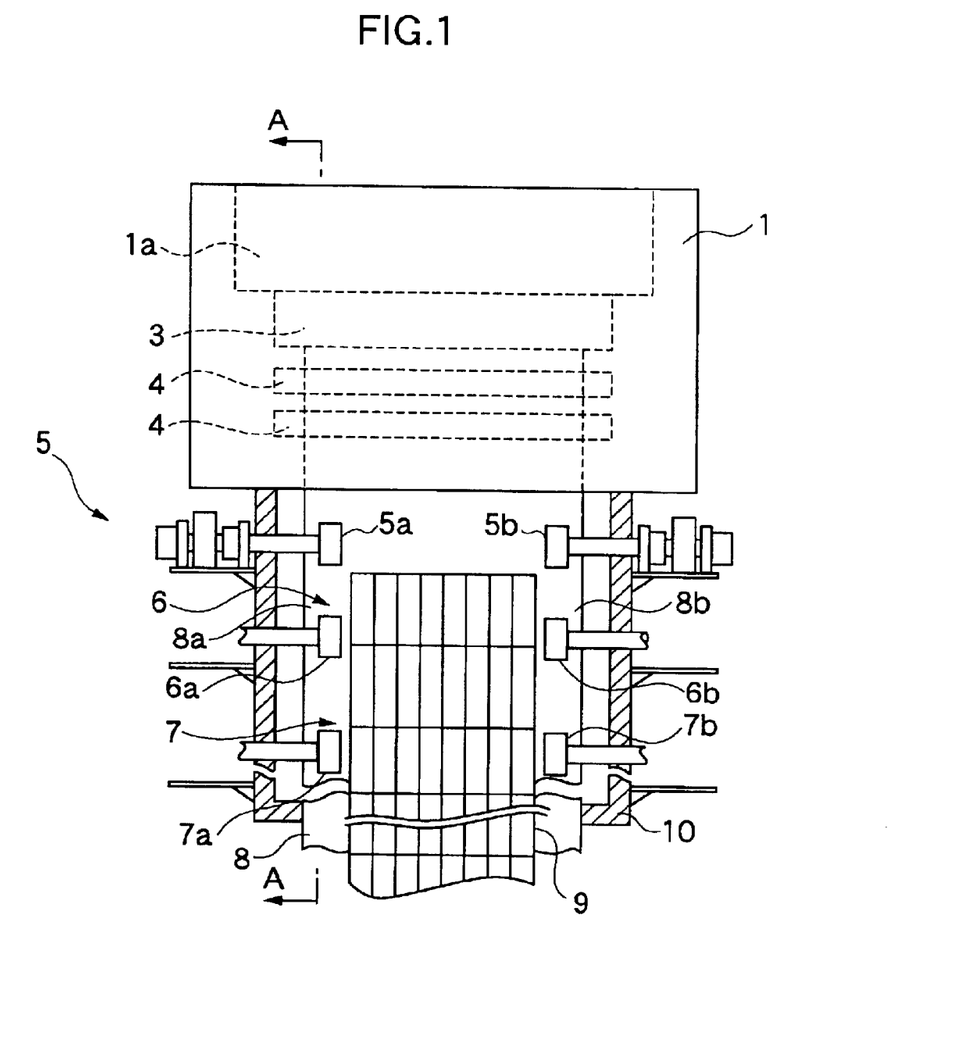
FIG. 1 is a schematic diagram showing an embodiment of the glass plate manufacturing apparatus of the present invention that manufactures sheet glass from molten glass.
Figure 2:
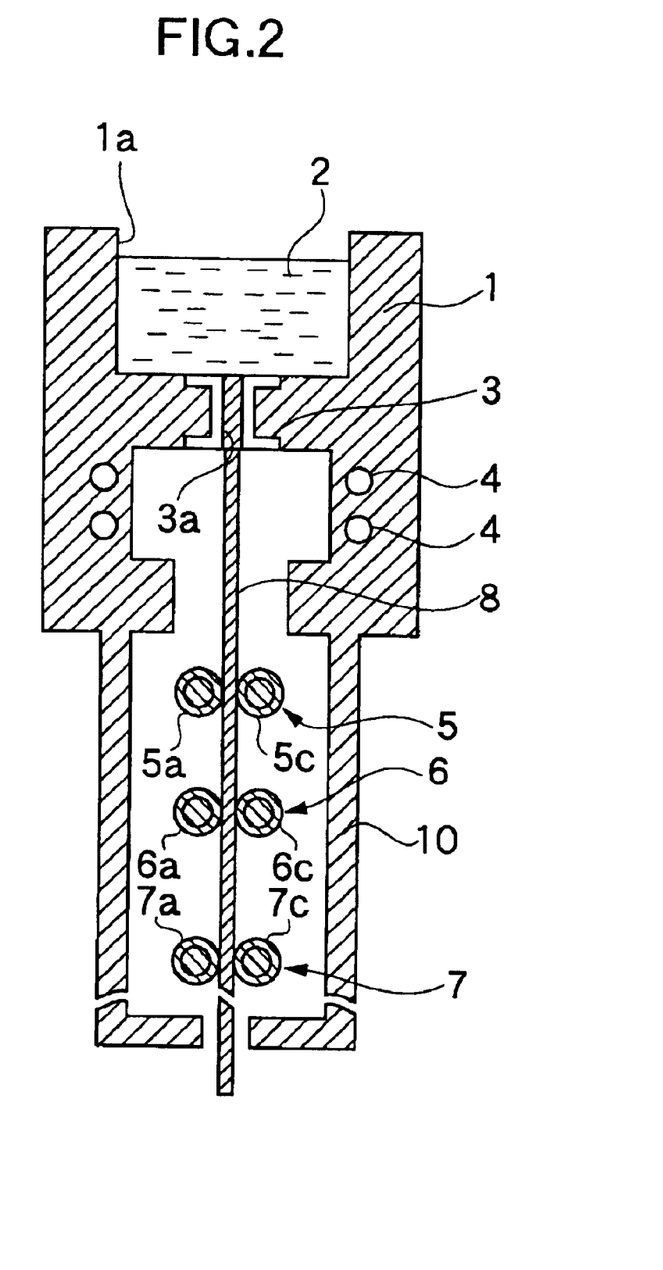
FIG. 2 is a cross-section of the apparatus shown in FIG. 1 cut along the A—A line.
Figure 3:
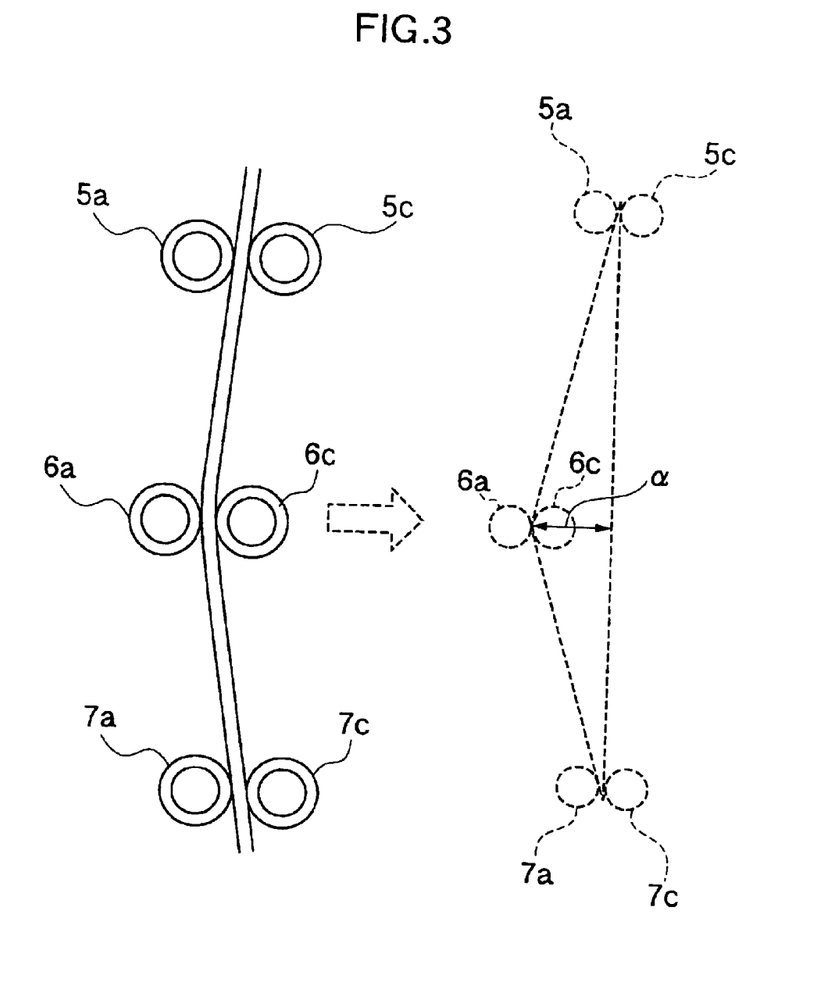
FIG. 3 is a side view of the drawing rollers shown in FIG.
Figure 4:
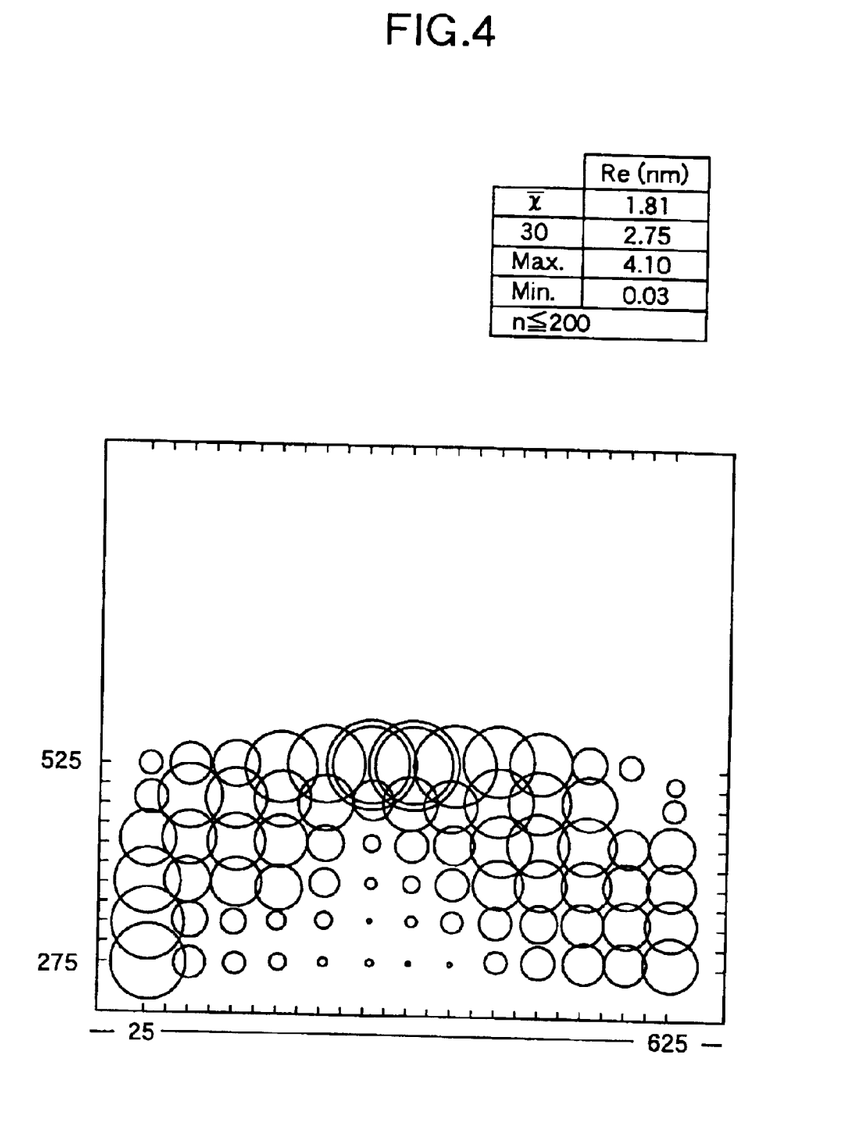
FIG. 4 is a drawing showing a strain distribution in a glass plate that has not undergone strain reduction processing.
Figure 5:
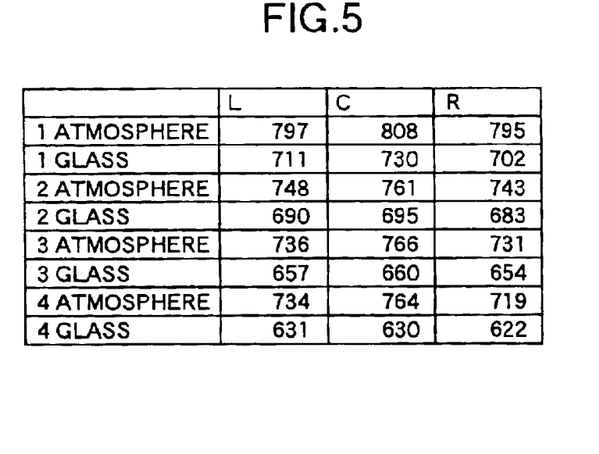
FIG. 5 is a table showing the temperatures of the heaters. nd the glass during the strain reduction processing.
Figure 6:
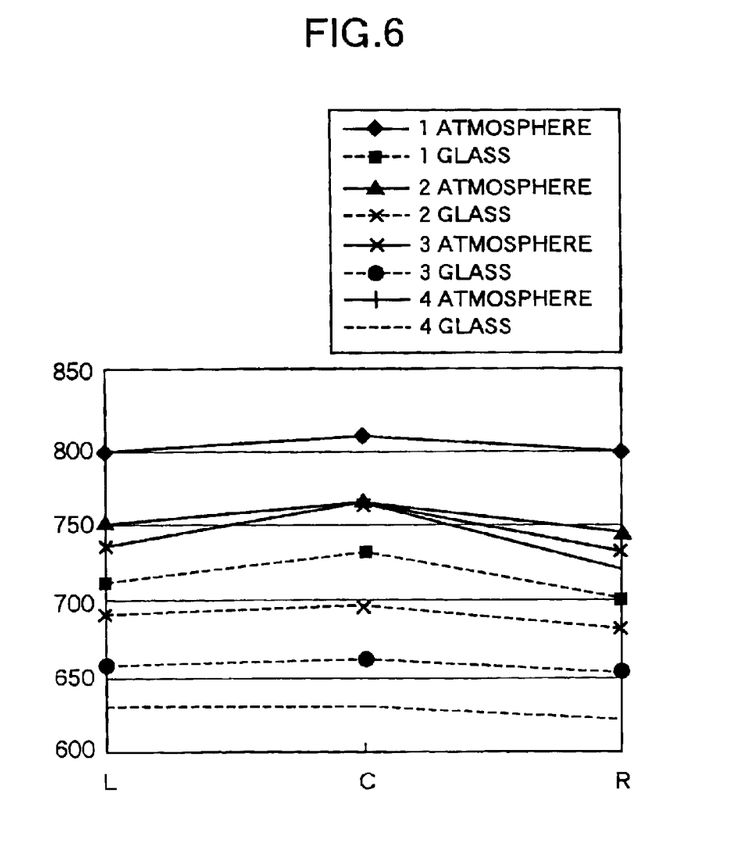
FIG. 6 is a graph of the data shown in FIG. 5.
Figure 7:
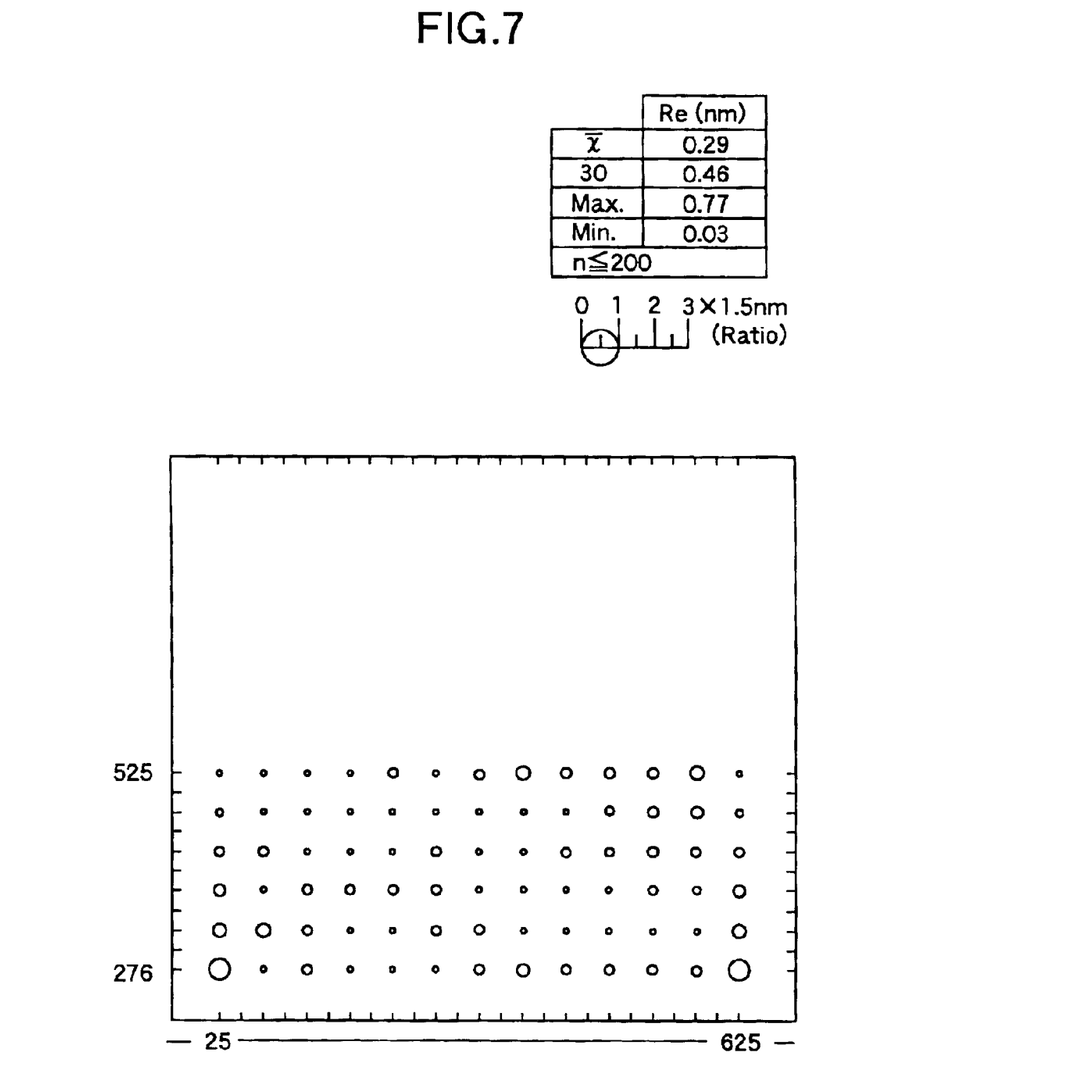
FIG. 7 is a draving showing the strain distribution in a glass plate after it has undergone strain reduction processing.
Figure 8:
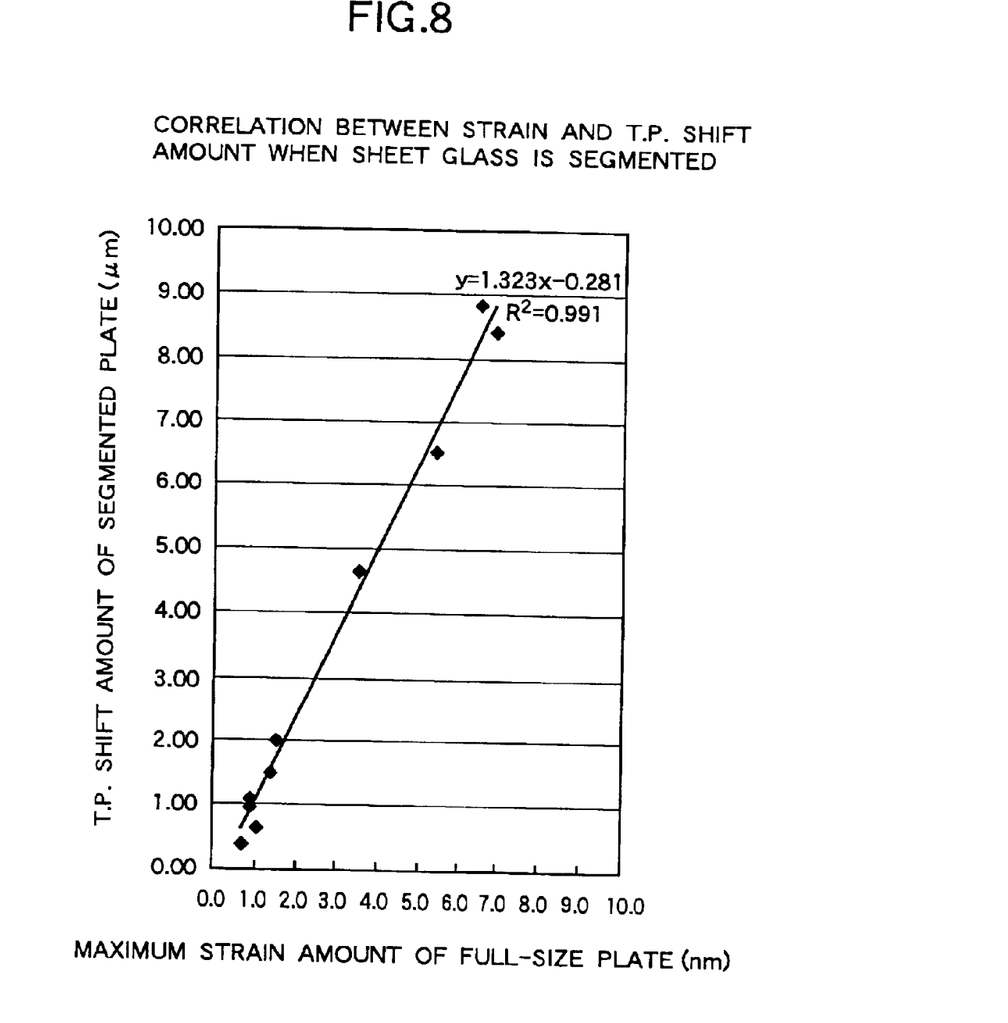
FIG. 8 is a drawing showing the relationship between the total pitch shift amount of a glass plate after it was cut out and the strain amount of the sheet glass before it was cut into pieces.

FIG. 1 is a schematic diagram showing an embodiment of the glass plate manufacturing apparatus of the present invention that manufactures sheet glass from molten glass, FIG. 2 is a cross-section of the apparatus shown in FIG. 1 cut along the A—A line, FIG. 3 is a side view of the rawing rollers shown in FIG. 1, FIG. 4 is a drawing showing a strain distribution in a glass plate that ham not undergone strain reduction processing, FIG. 5 is a table showing the temperatures of the heaters (heat treating unit) and the glass during tro strain reduction processing, FIG. 6 in a graph of the data shown in FIG. 5, FIG. 7 is a drawing showing the strain distribution in a glass plate after it has undergone strain reduction processing, and FIG. 8 is a drawing showing the relationship between the total pitch shift amount of a glass plate after it was cut out and the strain amount of the sheet glass before it was out into pieces.

Glass Plate Manufacturing Apparatus

First, a manufacturing apparatus that implements a glass plate manufacturing snethod and comprises one embodiment of the present invention will be described below with reference to FIGS. 1 through 3.

The glass plate manufacturing apparatus comprising one embodiment of the present invention comprises basically a molten glass storage tank 1 and a cooling oven 10, as shown in FIG. 1.

The molten glass storage tank 1 has a storage unit 1a having an openlng, and the molten glase 2 obtained through meltlng of the glass raw material at a prescribed temperature is stored in the storage unit 1a. A molding unit 3 is formed at the bottom edge of the storage unit 1a. A slit-shaped opening 3a that extends in the widthwise direction of the sheet glass 8 is formed in the molding unlit 3. The molding unit 3 comprises heat-resistant bricks coated with white gold.

The molten glass may be molded into sheet-shaped glass 8 by drawing the molten glass 2 through the opening 3a. The sheet glass 8 passing through the molding unit 3 is slowly cooled by heaters 4 in order to niblht the contraction of the edge areas toward the center area that would result from rapid cooling.

The slow cooling oven 10 slowly cools the glass 8 molded into a sheet shape and is hollow insde, such that as the edge areas of the sheet glass 8 are drawn downward by the drawing rollers 5 through 7, slowly cooling is carried out while rapid cooling of the sheet glass 8 is prevented by the heat treating unit 9.

The drawing rollers 5 through 7 are aligned in the direction of drawing of the sheet glass 8, and are located at prescribed distances from each other. The heat treating unit 9 is located at a prescribed distance from and near the main surface of the sheet glass 8.

The drawing rollers 5 througb 7 grasp the edge areas 8a and 8b of the sheet glass 8 and draw the sheet glass 8 downward. The drawing rollers 5a, 6a and 7a draw the sheet glass 8 downward in concert with the drawing rollers 5c, 6c and 7c located at the back side of the sheet glass 8, as shown in FIG. 2. The drawing rollers 5b, 6b and 7b shown in FIG. 1 also have drawing rollers not shown in the drawing that draw down the sheet glass in cooperation with the drawing rollers 5b, 6b and 7b and are located at the reverse side of the sheet glass 8.

The drawing rollers 5 through 7 that are aligned in the direction of drawing of the sheet glass 8 are positioned such that adjacent rollers are displaced relative to each other by a prescribed amount in the direction of thickness of the sheet glass 8. In this way, the edge areas of the sheet glass travel a longer distance than the surface area. For example, with regard to the roller pairs 5a/5c, 6a/6c and 7a/7c locate at the left side of FIG. 1, the rollers 6a/6c are displacead by a distance a relative to the rollers 5a/5c and 7a/7c. The rollers 5b, 6b and 7b shown in FIG. 1 are also positioned in a simllar fashion, though this is not apparent in the draving.

The heat treating unit 9 used for slow cooling may form a prescribed temperature distribution in both the widthwise direction and the drawing direction of the sheet glass 8 in order to prevent the occurrence of strain. Consequently, the heat treating unit 9 has a plurality of heaters aligned in the widthwise direction (the horizontal direction) and the drawing direction (the vertical direction) of the sheet glass 8. In the drawlng, a representative situation in which eight heaters are arrayed along the widthwise direction of the sheet glass 8 is shown. In addition, ten heaters, for example, are arrayed along the direction of drawing of the sheet glass 8, though these heaters are not shown in the drawlng. The temperature of each heater may be individually controlled. The use of plural heaters arrayed along the widthwise direction of the sheet glass 8 is intended to form identical prescribed temperature distributions in the same direction in order to reduce the occurrence of strain in the same direction. Furthermore, the use of multiple heaters along the direction of drawing of the sheet glass 8 is intended to form prescribed teaperature distributions that will prevent rapid cooling and permit slow cooling in the same direction. Rapid cooling is prevented in order to prevent damage to the sheet glass 8 during the drawing process. In particular, when rapid temperature changes occur to the sheet glass 8 within the range of 600–700° C. damage can easily occur to the sheet glass 8 due to buckling deformation.

Glass Plate Manufacturing Method

A method by which to manufacture a glass plate using the above apparatus will be explained below using the exasple of manufacture of a glass substrate for a liquid crystal display At the outset, preparations for the strain reduction processing are carried out. First, the amount of strain in the sheet glass 8 that has not undergone strain reduction processing is measured using the optical heterodyne method. The measurement sample is a glass plate out out from the sheet glass 8 and having a width of 650 mm and a length of 550 mm. The results of the measurement are shown in FIG. 4. As seen from the table, the amount of strain of the sheet glass 8 has a distribution wherein it increases gradually from the center region of the display area to the edge areas, and the mazxmum strain is the strain at which the birefringence Re is 4.1 nm (strain: 0.12 kg/mm$^2$).

The scale used in the drawing indicates the length in millimeters. The centers of the individual circles on the glass plate represent mensuremeat points, and the size of each circle indicates the amount of strain. While not shown in the drawing, the fast axis that indicates the direction of strain runs toward the center bottom edge of the glacs plate.

Next, data indicating the correlation between tne measured strain distribution and the amounts of positional adjustment of the drawing rollers 5 through 7, an well as data indioating the correlatlon between the strain distribution and the widthwise temperature distribution of the heat treating unit 9 are obtalned.

Based on this date, the amount of displacement regarding the drawing rollers 5 through 7 needed to reduce the occurrence of strain and the widthwise teiperature distribution of the sheet glass 8 set by the heat treating unit 9 are determined.

Based on these preparations, the sheet glass 8 is manufactured from molten glass.

First, the aluminosilicate raw material is melted at a melting temperature of 1550–1650° C. in a melting tank not shown in the drawings, and after refining and homogenization are carried out, molten glass is obtained. The molten glass is then moved from the rmlting tank to the storage unit 1$a$.

Incidentally, the alumlnosllicate glass raw material used was mixed so that the following composition would be obtained: 65% $SiO_2$, 11% $B_2O_3$, 12% $AL_2O_3$, 12% MgO, 5% CaO, 2.4% SrO, and 1.65% BaO.

The characteristies of this glass are as follows: Strain point=650° C., photoelastic constant=33nm/cm/kgf/cm$^2$.

Next, the molten glass 2 stored in the storage unit 1$a$ is formed into sheet glass 8 via the opening 3$a$ in the molding unit 3. The molding temperature for thin process is set to be 1150–1250° C.

The sheet glass 8 molded in this way is then slowly cooled by the strain reduction unit as the occurrence of strain is inhibited.

These strain reduction processes are explained below.

The strain reduction method combines two types of strain reduction methods: a method in which the amount of stretch of the sheet glass 8 due to heat contraction difference in controlled (method 1) and a method in which beat treatment is then carried out by forming a temperature distribution through a slow cooling process (method 2).

Method 1: Method in which Drawing Rollers 5 Through 7 are Displaced

When the sheet glass 8 is drawn downward by the drawing rollers 5 through 7, because one of the adjacent roller pairs (rollers 6) in offset by an amount α, the edge areas of the sheet glass 8 are drawn to a greater degree than the surface area. As a result, some of the strain attributable to a difference in the thickness of the edge areas and the surface area may be eliminated. This is based on the fol-lowlng effect.

In the prescribed distance in the direction in which the sheet glass 8 in conveyed, the amount of heat contraction of the surface area is larger than the amount of heat contraction of the edge areas. Therefore, if the surface area and the edge areas are drawn down in a uniformn fashion, strain occurs. Accordingly, if the drawing distance for the edge areas having a relatively smaller contraction amount is longer than the drawing distance for the surface area, appropriate drawing distances for the surface area and the edge areas may be maintained in accordance with the difference in their heat contraction amounts, and consequently, the occurrence of strain may be inhibited.

(Method 2: Method in which Heat Treatment is Performed Through Forming of Temperature Distribution During Slow Cooling Process The heat treating unit 9 of this embodiment has multiple heaters arrayed in the widthwise direction and the drawing direction of the sheet glass 8, as described above. The table shown in FIG. 5 indicates the temperatures (° C.) of each heater arrayed iu the widthwisa direction and the drawing direction of the sheet glass 8. as well as the temperature (° C.) of the sheet glass 8 at the areas corresponding to each heater.

The vertical columns in the table indicate the temperatures of the multiple heaters sequentially arrayed in the drawing direotion of the sheet glass 8 and the temperatures at the areas of the sheet glass 8 corresponding to each heater. Here, 'Atmosphere' indicates the temperature of each heater, while 'Glass' indicates the temperature of the sheet glass 8.

The temperature of each heater is measured through, for exampe, measurement of the temiperature of the air at a position located 20 mm away from the surface of the sheet glass 8 using a thermocouple. The temperature of the sheet glass 8 is measured through measurement of the temperature of the sheet glass 8 using a radiation thermometer.

The table shows the temperatures of four groups of heaters located at progressively farther distances from the molding unit 3, as well as the temperatures of the sheet glass 8 at areas corresponding to each heater. These four heater groups are referrd to as first, second, third and fourth heater groups in the order of their proximity to the molding unit 3.

In the table, '1 Atmosphere' through '4 Atmosphere' indiaate the teppratures of the first through fourth heater groups, respeotively. Simillarly, '1 Glass' through '4 Glass' indicate the temperatures of the sheet glass at the areas corresponding to the heaters of the first through fourth heater groups, respctively.

The 'L' in the first row lidcates the heater located at the left edge of the sheet glass 8 in the widthwise direction, the 'C' indicates the heater located at the center of the sheet glass 8, and the 'R' indicates the heater located at the right edge of the sheet glass 8.

FIG. 6 is a graphicll representation of the data shown in the table in FIG. 5.

As can be determined from FIGS. 5 and 6, the temperatures of the multiple heater groups arrayed in the widthwise direction of the sheet glass 8 are set so that the temperatures of the heaters located at the center of the sheet glass 8 are higher than the temperatures of the heaters located at the edges thereof. Specifically, the temperatures of the center heaters (° C.) are set to be 13–45° C. higher than the temperatures of the edge heaters (R and L). Furthermore, the differences in their temperatures are set to decline gradually from the first heater to the fourth heater.

At the same time, the temperature of the sheet glass 8 is set so that the temperature of the center of the surface area of the sheet glass 8 at the area corresponding to the first heater is 28° C. higher than the tempwratur of the edge areas. By contrast, the differeknce in temperature between the center area and the edge areas at the area corresponding to the third heater is set to be 3° C. In this way, the temperature of the sheet glass 8 in the widthwise direction in made uniform at this area. In addition, the temperature of the sheet glass 8 in the areas corresponding to the third heater group is controlled to equal the strain point temperature of 650° C. In other words, it can be Seen that the temperature of the sheet glass 8 is made uniform in the widthwise direction at a temerature near the strain point of the sheet glass 8.

The heater group that fulfills an important role in this embodiment is the third heater group, which carry out heat treatment at a temperature near the strain point. The first and second heater groups are located so as to prevent rapid temperature change due to the cooling of the sheet glass 8 from the molding temperature (1200° C.) to the strain point. The fourth heater group is located so as to carry out slow cooling of the sheet glass 8 to an even lower temperature while a uniform temperature distribution achieved by the third heater group is maintained. The fifth through tenth heater groups (not shown in the drawings) following the fourth heater group are located so as to gradually carry out slow cooling to the extraction temperature of the sheet glass 8 (150–180° C.), like the fourth heater group. In other words, those heater groups carry out incremental heat treatment of the sheet glass 8 so that slow cooling occurs while rapid cooling is prevented.

The sheet glass 8 conveyed to the extraction position is cut at prescribed intervals in the drawing direction and carried out from the apparatus.

The thickness of the sheet glass 8 when molding was completed was 4–6 mm at the edge area (the area extending 120–130 mm from the edge toward the center) of both the left and right sides, and 0.7 mm at the surface area located inside the edge areas. The external dimensions comprised a width of 1060 mm and a length of 110 mm. The edge areas regarding whch the thicness was not managed were then eliminated, and a glass plate having a usable width of 800 mm and a length of 110 mm was created. Here, the usable width is the width of the area having a uniform thickness.

The glass plate then underwent edge polishing and washing, and the final product was completed. The strain of the glass plate manufactured in this way was then measured using the optical heterodyne method. The result was a maximum birefringence Re of 0.77 (maximum strain: 0.04 kg/mm$^2$). The reasult of measurement of the stress distribution in this embodiment are shown in FIG. 7. An shown in the drawing, not only was the maximum strain amount reduced, but the strain distribution was made almost uniform.

From comparison of the glass plate of this embodiment and a conventional glass plate shown in FIG. 4. which was manufactured without strain reduction processing, it ts seen that the glass plate of this embodiment has superior strain uniformity and a smaller amount of strain.

In this embodiment, because damage to the sheet glass 8 occurring due to strain was prevented through the slow cooling process, the yield was improved by 10%.

Manufacturing of Liquid Crystal Device

A liquid crystal device was mufactured from the glass plates mianufactured through the above embodiment. Specifically, two 423×275 mm glass plates were CUt out from a single 550×650 mm full-slze glass plate. The total pitch shift amount of these cut out plates was 0.40 μm. It is preferred that the total pitch shift amount be 1.0 μm or lower.

If the relationship between the total pitch shift amount and the strain of a full-size glass plate (the size of the glass plate before the smaller glass plates are out out) is sought beforehand, the total pitch shift amount of the glass plates used in an actual display apparatus can be managed via managemant of the strain amount of the full-size glass plate. FIG. 8 shown a graph indicating the correlation between these two values. In the graph, the vertical axis represents the total pitoh shift amount (in μm) occurring in the glass plate obtained through cutting, and the horizontal azxi represents the birefringence (in nm) of a full-sise glass plate prior to cutting.

From the glass plates of this embodim nt in which the oocurrence of strain was inhibited, color filter glass substrates and TFT glass substrates were manufactured. Liquid crystal display devices were then manufactured by aligning the all gnent marks on each glass plate. Because the glass plates of this embodiment having reduced strain were used here, the manufacture of the liquid crystal devices could be carried out with a high yield.

The present invention way be applied to a downdraw method different from the downdraw method of the embodiment described above. For example, the present invention may be applied to the conventional downdraw method described with reference to the prior art.

In the above embodiment, two types of strain reduction processes were used, but it is acceptable if only one of these processes is used in regard to the present invention.

Furthermore, the above embodiment used a heat treating unit comprising multiple heaters arrayed in the widthwise direction of the sheet glass 8 such that a prescribed temperature distribution was formed in the same direction through individual control of the temperatures of the heaters. However, it is acceptable if the present invention uses a heat treating unit that has only a single heater than emits a uniform heat, and a prescribed temperature distribution in the widthwise direction of the sheet glass 8 is obtained through the placement of appropriate theraal insulators on the surfaoe of the heater.

Moreover, the present invention may be applied in the manufacture of glass substrates used in a display apparatus other than a liquid crystal device or in a different electronic product (such as an lnformtlon recording medium).

Industrial Applicability

Using the present invention, sheet glass in which the occurrence of strain is inhiblted may be manufactured usiug the downdraw method. In particular, the occurrence of strain in the widthlwise direction of the sheet glass may be inhibited. As a result, strain in the glass plates out out from the sheet glass may be reduced.

Therefore, when a fine pattern is formed via photolithography on a glass plate manufactured using the present invention, offset of the position of the pattern may be prevented.

Furthermore, where sheet glass is manufactured via the downdraw method using the present invention, because the occurrence of heat strain is inhibited, when the sheet-shaped glass is drawn downward while being slowly cooled, damage to the sheet-shaped glass may be prevented. As a result, the production yield may be improved.

In addition, using the display glass substrates manufactured using the present invention, the yield obtained in the manufacture of the display apparatuses may be improved.

What is claimed is:

1. A glass plate manufacturing method for manufacturing a glass plate by forming molten glass into a sheet using the downdraw method and subjecting the obtained sheet glass to slow cooling using a heat treating unit;

wherein a strain reduction process to reduce strain occurring in the sheet glass due to temperature difference between the edge areas and the surface area in the widthwise direction of the sheet glass is carried out during the slow cooling; and wherein an extension process, that reduces strain occurring from the surface area to the edge areas bv increasing the amount of extension of the edge areas relative to the amount of extension of the surface area in accordance with a heat contraction difference occurring between the edge areas and the surface area in the widthwise direction of the sheet glass, is carried out as the strain reduction process.

2. The glass plate manufacturing method according to claim 1, wherein the temperature difference occurs between the center region of the surface area and the edge areas.

3. The glass plate manufacturing method according to claim 1, wherein the sheet glass subjected to slow cooling exhibits a widthwise temperature distribution such that the surface area has a lower temperature than the edge areas.

4. The glass plate manufacturing method according to claim 1, wherein the strain reduction process comprises a process which measures strain distribution in the post-molding glass plate in advance using the optical heterodvne method, and reduces the strain in the widthwise direction of the sheet glass based on the measured strain distribution.

5. The glass plate manufacturing method according to claim 1, wherein a heat treatment that forms a prescribed temperature distribution in the widthwise direction of the sheet glass so that the strain in the widthwise direction of the sheet glass after molding is reduced, is further carried out as the strain reduction process.

6. The glass plate manufacturing method according to claim 5, wherein the heat treatment is carried out at least during a process in which the sheet glass is slowly cooled from the molding temperature to a temperature near the strain point.

7. The sheet glass manufacturing method according to claim 5, wherein the heat treatment is a process in which the temperature distribution that is formed, in the widthwise direction of the sheet glass, by the heat treating unit for heating the sheet glass is set such that the temperature difference in the widthwise direction of the sheet glass may be reduced.

8. The glass plate manufacturing method according to claim 1, wherein the glass plate is a glass substrate used in a display apparatus.

9. A glass plate manufacturing apparatus comprising:

a molding unit that molds molten glass provided continuously from a molten glass storage tanlk into a sheet;

a drawing unit that draws down the sheet glass molded by molding unit and existing in a softened state; and a strain reduction unit that reduces the strain caused by the temperature difference occurring from the edge areas to the surface area in the widthwise direction of the sheet glass;

wherein the strain reduction unit has:

a heat treating unit that slowly cools the sheet plass after molding; and a controlling unit that performs control to ensure that the amount of extension of the edge areas is larger than the amount of extension of the surface area in accordance with the temperature difference from the surface area to the edge areas of the sheet glass that is being slowly cooled by the heat treating unit.

10. The glass plate manufacturing apparatus according to claim 9, wherein the heat treating unit comprises a unit that sets in the widthwise direction of the sheet glass a temperature distribution that reduces the strain in the widthwise direction of the post-molding sheet glass.

* * * * *

UNITED STATES PATENT AND TRADEMARK OFFICE
CERTIFICATE OF CORRECTION

PATENT NO.   : 6,758,064 B1
DATED        : July 6, 2004
INVENTOR(S)  : Hiroyuki Kariya

It is certified that error appears in the above-identified patent and that said Letters Patent is hereby corrected as shown below:

Column 11,
Line 25, after "due to" insert -- a --
Line 30, change "bv" to -- by --
Line 47, change "heterodvne" to -- heterodyne --.

Column 12,
Line 34, change "plass" to -- glass --

Signed and Sealed this

Seventh Day of December, 2004

JON W. DUDAS
*Director of the United States Patent and Trademark Office*